United States Patent [19]

Nagataki et al.

[11] Patent Number: 4,607,718
[45] Date of Patent: Aug. 26, 1986

[54] MOTORCYCLE

[75] Inventors: Motoi Nagataki; Takashi Inagaki, both of Saitama, Japan

[73] Assignee: Honda Giken Kogyo Kabushiki Kaisha, Tokyo, Japan

[21] Appl. No.: 644,916

[22] Filed: Aug. 27, 1984

[30] Foreign Application Priority Data

Sep. 1, 1983 [JP] Japan .................. 58-160982
Sep. 1, 1983 [JP] Japan .................. 58-160981

[51] Int. Cl.⁴ ................... B62M 7/02; B62M 17/00
[52] U.S. Cl. ................................................... 180/226
[58] Field of Search ............... 180/226, 224, 219, 228

[56] References Cited

U.S. PATENT DOCUMENTS 841,434  1/1907  Pequegnat et al. .............. 180/226
1,378,309  5/1921  Amiot ............................. 180/226

FOREIGN PATENT DOCUMENTS 325766  4/1919  Fed. Rep. of Germany ...... 180/226
393947  6/1933  United Kingdom ............... 180/226

Primary Examiner—John A. Pekar
Attorney, Agent, or Firm—Lyon & Lyon

[57] ABSTRACT

A motorcycle having an engine inclined to the symmetrical center plane of the motorcycle frame. A drive shaft employed with the engine is inclined relative to the center plane of the motorcycle frame so as to diverge outwardly from the center plane as it extends rearwardly from the engine.

5 Claims, 5 Drawing Figures

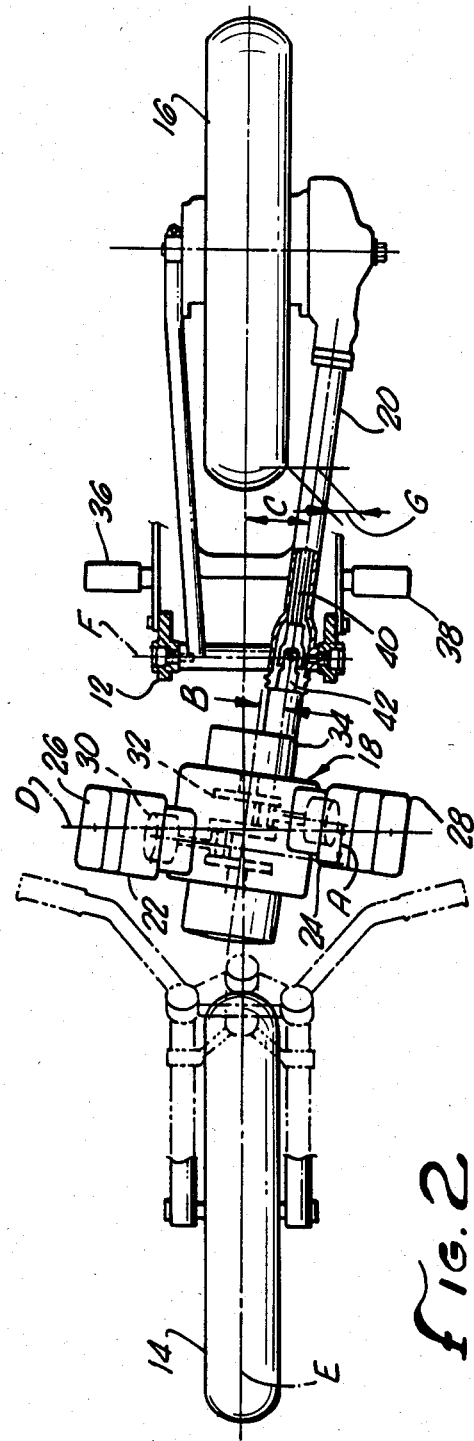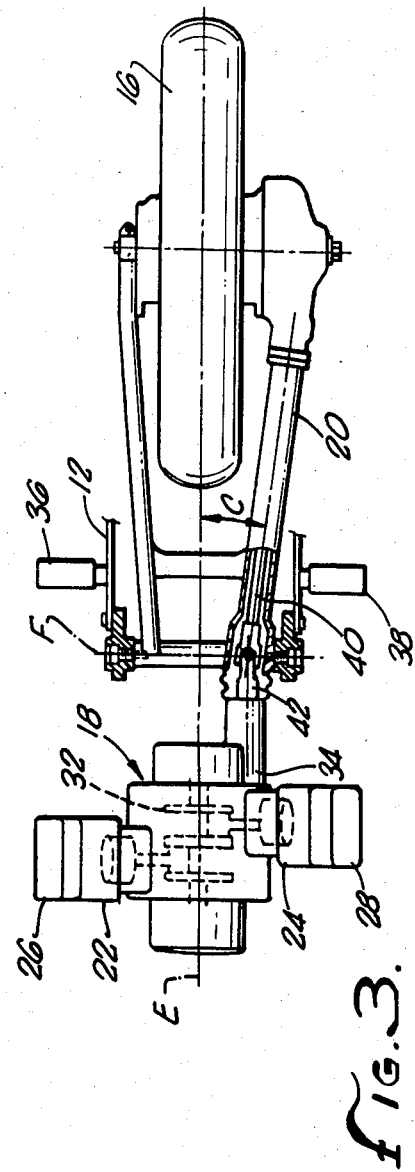

MOTORCYCLE

BACKGROUND OF THE INVENTION

The field of the present invention is motorcycles and the drive train arrangements therefor.

In the construction of motorcycles, a paramount design consideration has generally been the overall size of the vehicle. A variety of factors contribute to the overall length of the motorcycle. One such factor is the proper location of the driver's footpegs. The pegs are symmetrically disposed on the device for maximum rider stability and control. At the same time, the footpegs must be located such that the rider's feet do not interfere with other components of the vehicle such as the engine.

The width of the vehicle, particularly adjacent the lower portion thereof, is also determined by a number of factors. By reducing the width near the bottom of the motorcycle, banking and overall maneuverability may be enhanced. With shaft drive motorcycles, a shaft must extend rearwardly on one side of the rear wheel from the output of the engine and transmission assembly. Such a shaft adds to the width of the motorcycle at the lower portion thereof such that banking may be restricted.

SUMMARY OF THE INVENTION

The present invention is directed to motorcycle drive train arrangements wherein the length and width of the overall motorcycle may be reduced through specific drive train configurations.

In a first aspect of the present invention, a drive shaft extending between the engine and transmission assembly and the rear wheel is arranged such that it diverges outwardly from the symmetrical center plane of the vehicle as it extends rearwardly from the engine. This arrangement reduces the overall width of the motorcycle required at the engine and transmission assembly by moving inwardly the coupling to the drive shaft. This in turn may result in increased maneuverability through increased ground clearance with the motorcycle banked toward the drive shaft.

In another aspect of the present invention, when multicylinder engines of a V-type or opposed-type are employed, the cylinder banks must be offset one forwardly of the other in order that each piston may be connected by connecting rods at separate locations on the crankshaft. With one cylinder bank forwardly of the other on the engine, additional spacing is required on one side of the motorcycle than on the other. The location of the footpegs may thus be limited by the location of the rearward most cylinder bank. By orienting the engine with the crankshaft inclined relative to the center plane of the motorcycle, the centers of the cylinder heads may be moved until a line drawn therebetween is normal to the center plane. In this arrangement, the rearward most cylinder bank is moved forwardly. The footpegs may be moved forwardly a similar amount. Thus, the overall length of the motorcycle may be reduced.

Accordingly, it is an object of the present invention to provide drive train orientation to minimize overall vehicle width and/or length. Other and further objects and advantages will appear hereinafter.

BRIEF DESCRIPTION OF THE DRAWINGS

FIG. 2 is a plan view of the embodiment of FIG. 1 with portions broken away for clarity.

FIG. 3 is a partial plan view of a second embodiment of the present invention.

DETAILED DESCRIPTION OF THE PREFERRED EMBODIMENT

Figure 1:
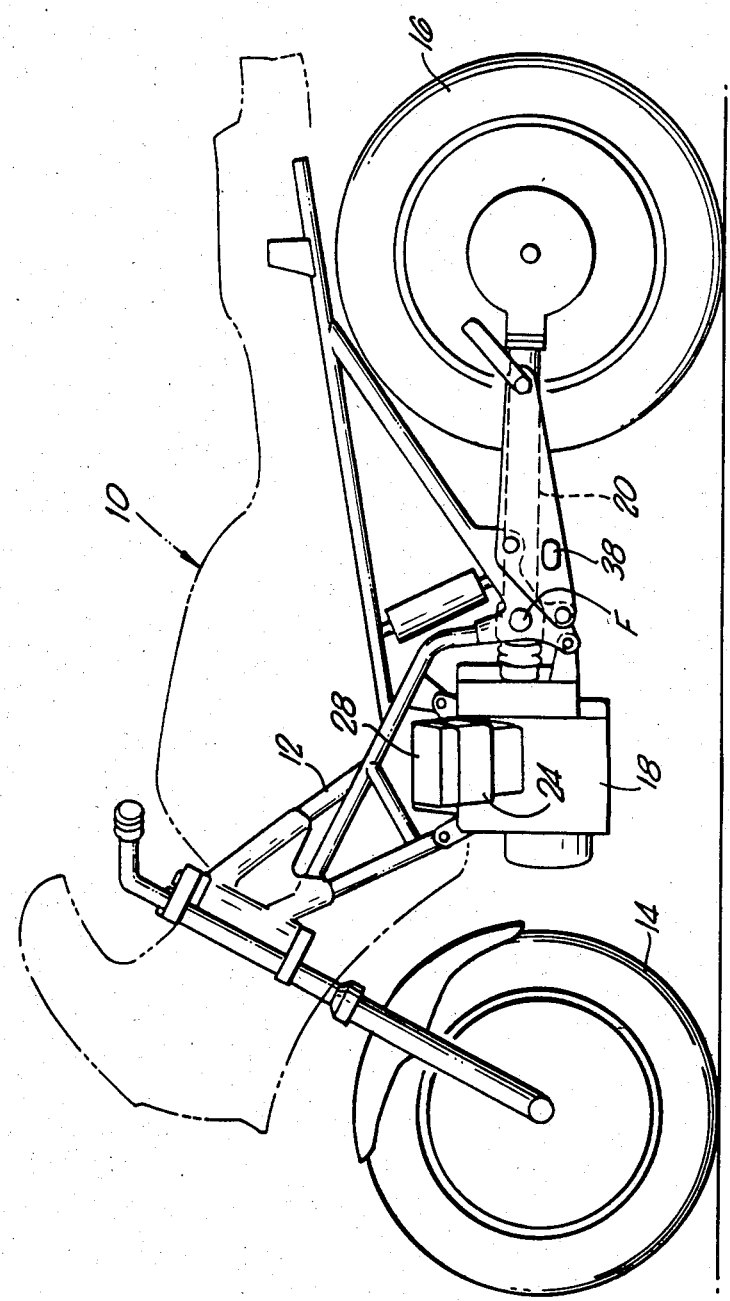
FIG. 1 is a side elevation of a first embodiment of the present invention.

Turning in detail to the drawings, FIG. 1 illustrates a motorcycle 10 having a frame 12, a front wheel 14, a rear wheel 16 and an engine assembly 18. A drive shaft and rear fork assembly 20 extends from the engine assembly 18 to the rear wheel 16.

Turning to the greater detail illustrated in FIG. 2, the engine assembly 18 is shown to include cylinders 22 and 24 having heads 26 and 28, respectively. Pistons 30 are positioned within the cylinders and are coupled with a crankshaft 32. The engine extends to a transmission case 34 through which the output is directed. Through a comparison of the centerlines illustrated in FIG. 2, it can be seen that the cylinder banks 22 and 24 are offset by a distance A while the lateral offset of the engine assembly output shaft from the centerline of the crankshaft is shown as distance B.

The engine illustrated in the embodiment of FIG. 2 is oriented with the crankshaft 32 at an angle C. This results in an alignment of the centers of the cylinder heads 26 and 28 such that a line D may be drawn between the centers which is also normal to the symmetrical center plane E of the motorcycle. Because of this orientation of the engine 18, the footpegs 36 and 38 are shown to be equidistant from the cylinder heads 26 and 28.

Looking in FIG. 2 to the drive train rearwardly of the engine assembly 18, a rear fork assembly 20 is pivotally mounted about a centerline F. Contained within one side of the fork assembly 20 is a drive shaft 40. The drive shaft 40 is connected with an output shaft 42 from the engine assembly 18 at a universal joint in line with a transverse centerline F. The centerline F is the axis about which the rear fork pivots. The shaft 40 is also illustrated as being at an angle C to the centerline E of the motorcycle frame 12. This inclination moves the forward end of the drive shaft 40 inwardly as represented by G.

Because of the arrangement of the engine 18 inclined by an angle C, the footpeg 38 may be moved forwardly toward the cylinder 24 without becoming too close. The overall motorcycle may be then shortened accordingly. Similarly, the orientation of the drive shaft 40 inclined at the angle C from the center plane of the vehicle reduces the overall width at the lower portion of the motorcycle to further enhance the compact design of the motorcycle.

Looking next to the embodiment of FIG. 3, similar reference numerals are employed to denote identical or equivalent components. In this embodiment, the engine assembly 18 is illustrated with the crankcase in alignment with the center plane E of the motorcycle. In this instance, the angle C of the drive shaft 40 is accommodated at the universal joint between the drive shaft 40 and the output shaft 42.

Figure 4A:
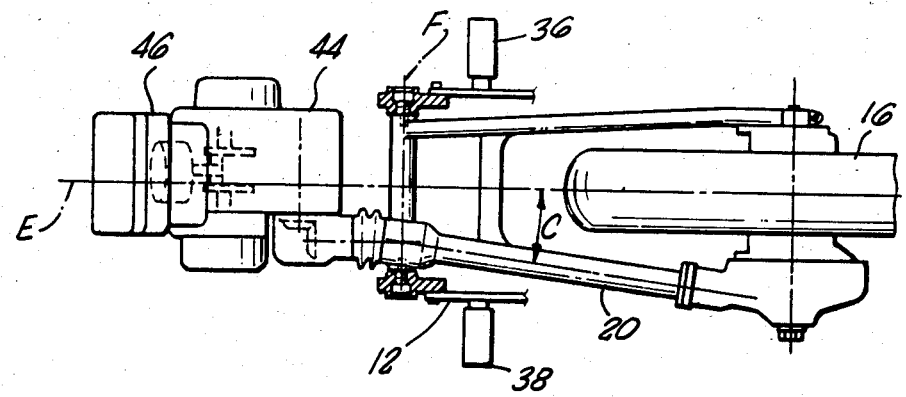
FIG. 4A is a plan view of yet another embodiment of the present invention.
Figure 4B:
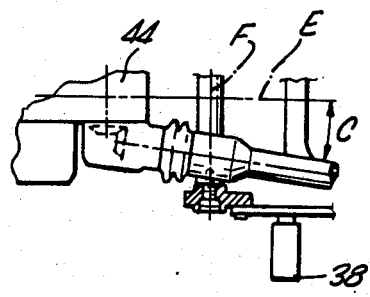
FIG. 4B is a plan view of a detailed modification of the embodiment of FIG. 4A.

FIG. 4A illustrates yet another embodiment of the present invention employing a single cylinder bank arrangement. Once again, identical or equivalent components are given corresponding reference numerals to the prior embodiments. A single cylinder engine 44 includes a forwardly extending cylinder 46 conventionally arranged on the vehicle. The drive shaft encased within the rear fork assembly 20 is provided with the angle C accommodated through the universal joint in an arrangement more fully illustrated in the embodiment of FIG. 3. Output is through a bevel gear assembly to direct rotational power aft. In the companion embodiment of FIG. 4B, the output shaft from the engine assembly 44 is provided at the angle C such that a bevel gear arrangement accommodates the inclination rather than the universal joint. The universal joint remains to accommodate the swing motion of the rear suspension.

Thus, a drive train arrangement for a motorcycle is disclosed which provides for a compact motorcycle design. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A motorcycle comprising
    a frame having a substantially symmetrical center plane;
    an engine mounted on said frame;
    a rear wheel operatively mounted to said frame; and
    a drive train from said engine to said rear wheel and including a drive shaft diverging from said center plane of said frame rearwardly of said engine, said engine including two cylinder branks extending laterally on opposite sides of said center plane with one of said cylinder banks being located forwardly of the other of said cylinder banks of said frame, cylinder heads for said cylinder banks and a crankshaft, said crankshaft extending at an angle to said center plane such that a line between the centers of said cylinder banks is normal to said center plane.

2. The motorcycle of claim 1 wherein said crankshaft is aligned with said drive shaft.

3. A motorcycle comprising
    a frame having a substantially symmetrical center plane;
    an engine mounted on said frame and including two cylinder banks extending laterally on opposite sides of said center plane with one of said cylinder banks being located forwardly of the other of said cylinder banks on said frame, cylinder heads for said cylinder banks and a crankshaft, said crankshaft extending at an angle to said center plane such that a line between the centers of said cylinder banks is normal to said center plane.

4. The motorcycle of claim 3 where each said cylinder bank includes a single cylinder.

5. The motorcycle of claim 3 wherein said frame includes outwardly extending footpegs, said footpegs being a uniform distance from the centers of said cylinder heads.

* * * * *